(12) United States Patent
Shibata et al.

(10) Patent No.: US 7,401,534 B2
(45) Date of Patent: Jul. 22, 2008

(54) ACTUATOR DEVICE

(75) Inventors: Naohiko Shibata, Hamamatsu (JP);
Tomonobu Hyodo, Shizuoka-ken (JP);
Yukinobu Kujira, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 806 days.

(21) Appl. No.: 10/852,931

(22) Filed: May 25, 2004

(65) Prior Publication Data

US 2005/0025641 A1 Feb. 3, 2005

(30) Foreign Application Priority Data

Jul. 30, 2003 (JP) .............................. 2003-283064

(51) Int. Cl.
*F16H 1/22* (2006.01)
*B60H 1/00* (2006.01)

(52) U.S. Cl. ..................... 74/425; 74/416; 74/665 GA

(58) Field of Classification Search .................. 74/413, 74/414, 416, 417, 420, 421 R, 665 G, 665 GA, 74/665 GB, 665 GC, 665 GD, 425

See application file for complete search history.

(56) References Cited

U.S. PATENT DOCUMENTS

| 1,589,928 | A | | 6/1926 | Bee | |
|---|---|---|---|---|---|
| 1,942,689 | A | * | 1/1934 | Erbach | ........................ 52/27 |
| 2,179,171 | A | * | 11/1939 | Boho | .................... 74/665 GA |
| 3,779,100 | A | * | 12/1973 | Schmidt | .................. 74/665 N |

FOREIGN PATENT DOCUMENTS

| JP | 08-070553 | 3/1996 |
|---|---|---|
| JP | 10006748 | 1/1998 |

OTHER PUBLICATIONS

European Search Report from related European Application No. 04012352.3 (Jun. 28, 2007).

* cited by examiner

*Primary Examiner*—William C Joyce
(74) *Attorney, Agent, or Firm*—Marsh Fischmann & Breyfogle LLP

(57) ABSTRACT

An actuator device includes a drive motor, gears and pairs of rotary shafts. The gears are rotated by torque outputted from the drive motor. Each pair of rotary shafts corresponds to one of the gears. The rotary shafts in each pair extend from both axial sides of the corresponding gear, respectively. At least two of the rotary shafts function as output shafts that are capable of outputting the torque of the corresponding gear or gears to the outside. This is capable of dealing with various requirements.

17 Claims, 8 Drawing Sheets

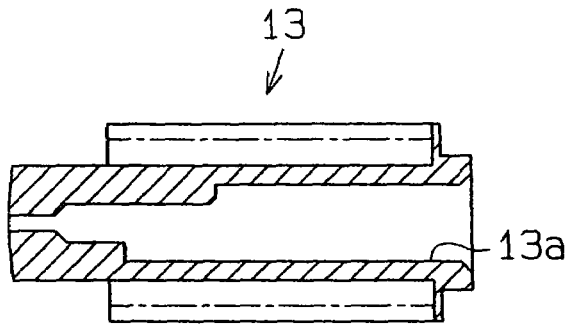
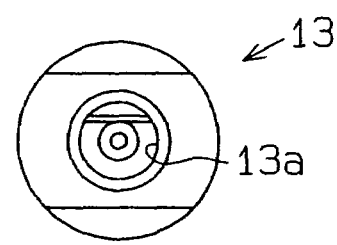
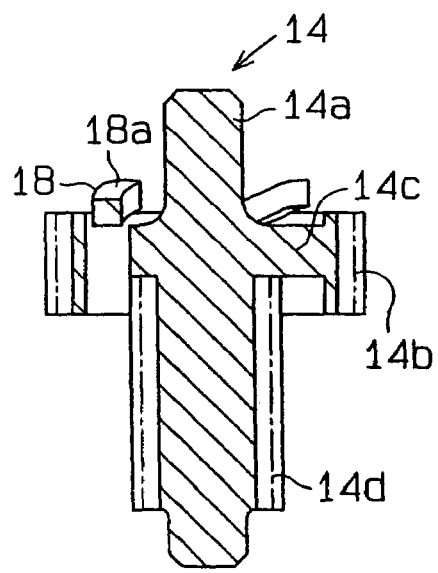
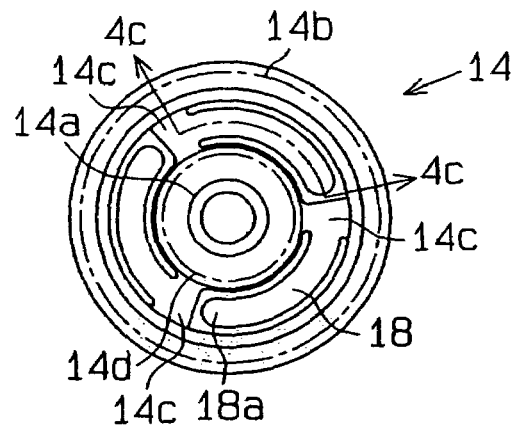
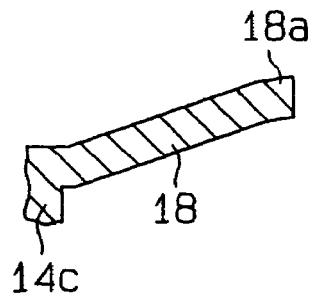

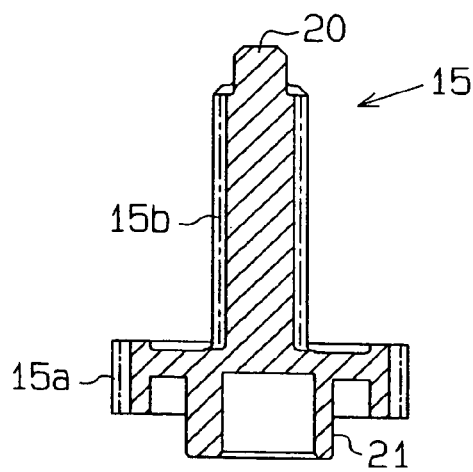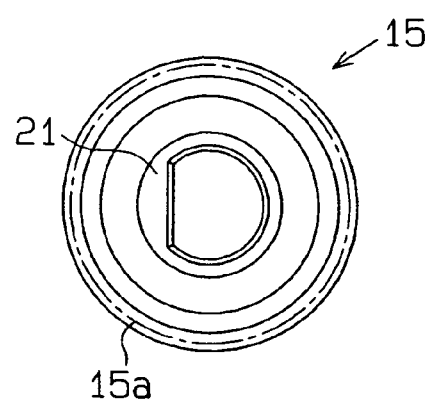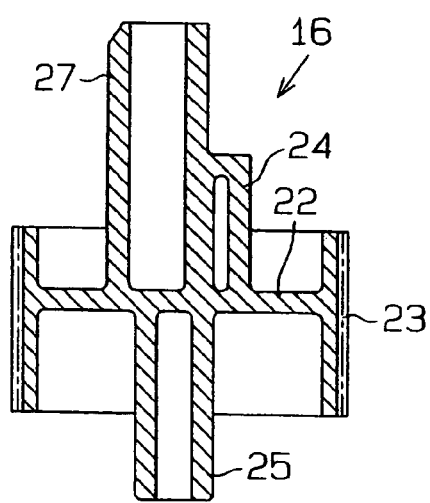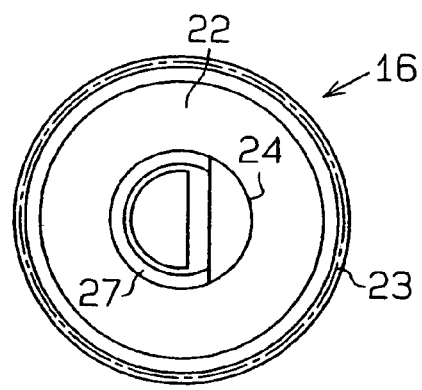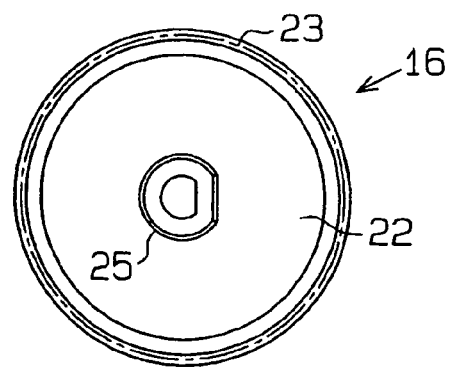

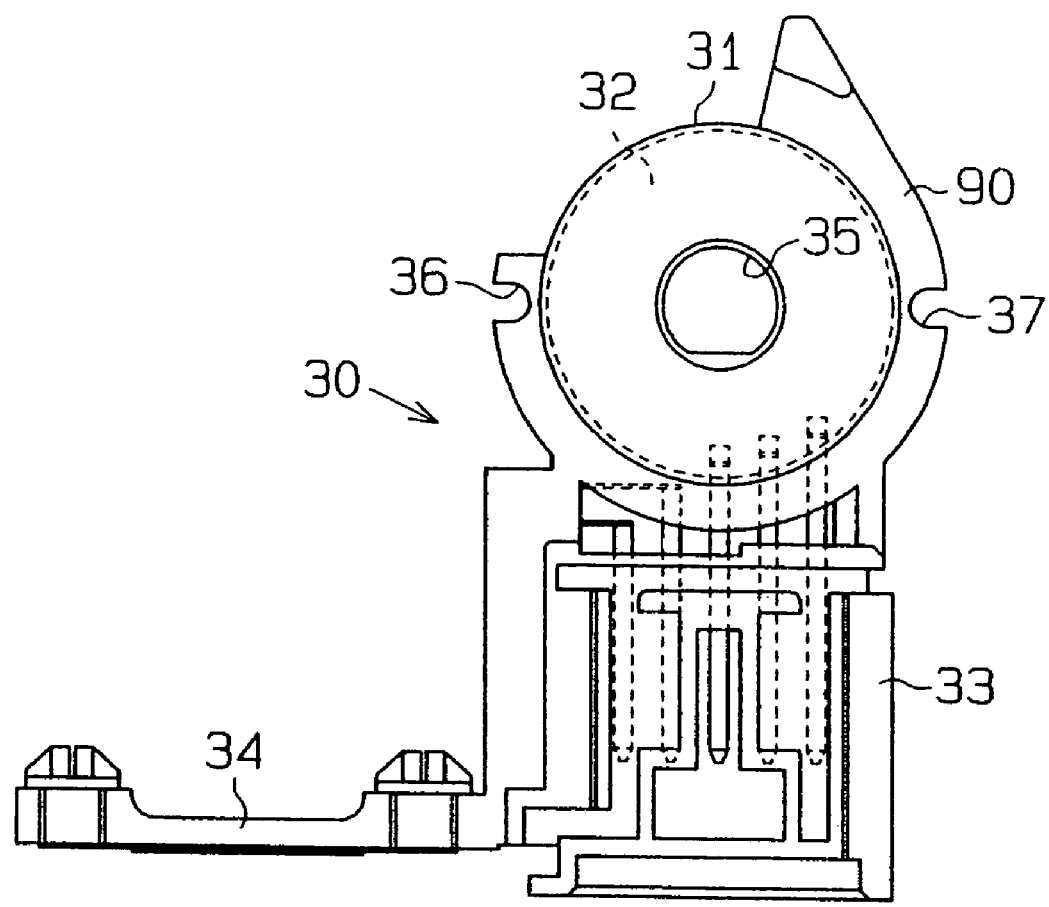

US 7,401,534 B2

ACTUATOR DEVICE

BACKGROUND OF THE INVENTION

The present invention relates to an actuator device comprising a drive motor.

In a conventional vehicle air conditioner, there are provided various types of dampers for controlling airflow in an air duct. These dampers are driven by actuator devices with an electric motor as a driving source, respectively. Such an actuator device has been disclosed, for example, in Japanese Laid-Open Patent Publication No. 8-70553.

The above-described dampers are disposed at mutually different locations within the air duct, respectively, and a torque required for driving them is also different. Therefore, the actuator devices having mutually different constitutions to suit with the corresponding dampers, respectively are provided. To be more precise, each actuator device comprises a plurality of gears, which constitute a speed reducer. To suit with the corresponding dampers, plural types of the actuator devices comprising gears having a different gear ratio and also having different output take out positions are provided for one set of the air conditioner. Further, when the design of the air duct is modified, this results in that the actuator devices having different constitutions have to be newly designed and manufactured. Therefore, the cost of the actuator devices itself and the cost of the inventory control of the actuator device are increased.

SUMMARY OF THE INVENTION

The objective of the present invention is to provide an actuator device capable of dealing with various requirements.

In order to achieve the object stated above, an actuator device is provided. The actuator device has a drive motor, a plurality of gears and pairs of rotary shafts. The gears are rotated by torque outputted from the drive motor. Each pair corresponds to one of the gears. The rotary shafts in each pair extend from both axial sides of the corresponding gear, respectively. At least two of the rotary shafts function as output shafts that are capable of outputting the torque of the corresponding gear or gears to the outside.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(a) is a cross-sectional view of a worm equipped on the actuator device of FIG. 2;

FIG. 3(b) is a view of the worm of FIG. 3(a) seen from an axial direction;

FIG. 4(a) is a cross-sectional front view of a first reduction gear equipped on the actuator device of FIG. 2;

FIG. 4(b) is a top plan view of the first reduction gear of FIG. 4(a);

FIG. 4(c) is a sectional view taken along line 4c-4c of FIG. 4(b);

FIG. 5(a) is a cross-sectional front view of a second reduction gear equipped on the actuator device of FIG. 2;

FIG. 5(B)5(b) is a top plan view of the second reduction gear of FIG. 5(a);

FIG. 6(a) is a cross-sectional front view of a third reduction gear equipped on the actuator device of FIG. 2;

FIG. 6(b) is a top plan view of the third reduction gear of FIG. 6(a);

FIG. 6(c) is a bottom view of the third reduction gear of FIG. 6(a);

FIG. 7 is a top plan view of a connector assembly equipped on the actuator device of FIG. 2;

DETAILED DESCRIPTION OF THE PREFERRED EMBODIMENTS

A vehicle air conditioner according to a first embodiment of the present invention will be described below with reference to FIGS. 1 to 11.

Figure 11:
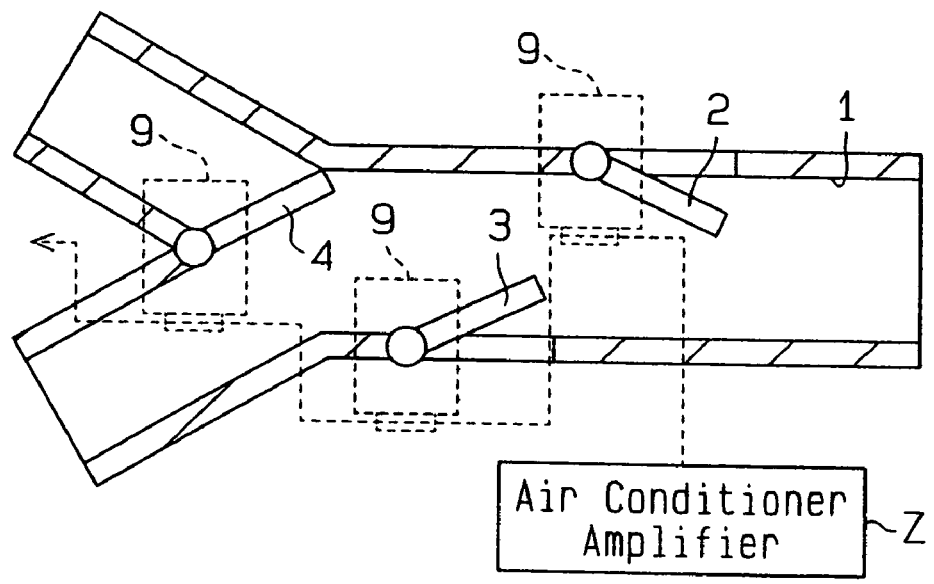
FIG. 11 is a schematic cross-sectional view of an air conditioner passage.

As shown in FIG. 11, the air conditioner comprises an air conditioner passage 1 for circulating the air. In the air conditioner passage 1, there are provided a plurality (three pieces in the case of FIG. 11) of dampers 2, 3 and 4. The dampers 2 to 4 control the direction of the air flow within the air conditioner passage 1, and, for example, change an air feed port to an outside air feed port or a vehicle interior circulation port, and open and close respective air ports, that is, a ventilator outlet, a floor outlet, and a defroster nozzle. The respective dampers 2 to 4 are provided with an actuator device 9. Each actuator device 9 drives the corresponding one of the dampers 2 to 4 based on a control signal and electric power inputted from an air conditioner amplifier Z.

Figure 2:
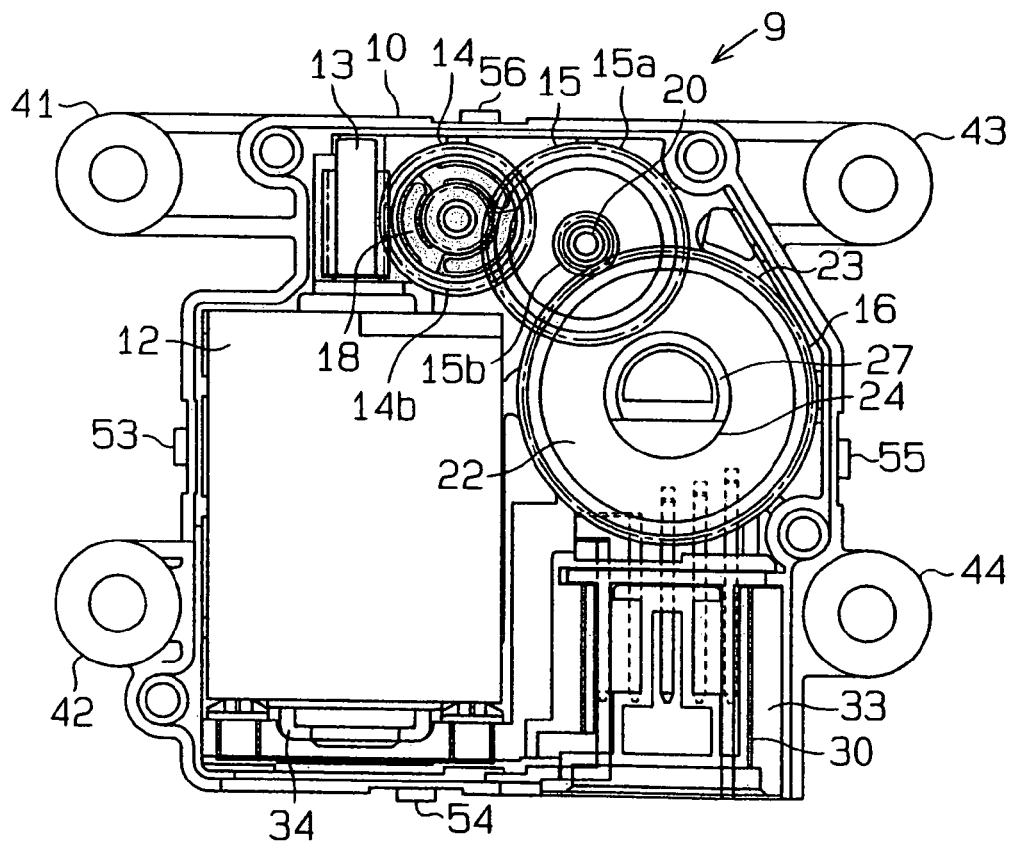
FIG. 2 is a top plan view of the actuator device of FIG. 1 in a state of a top case being taken off.
Figure 10:
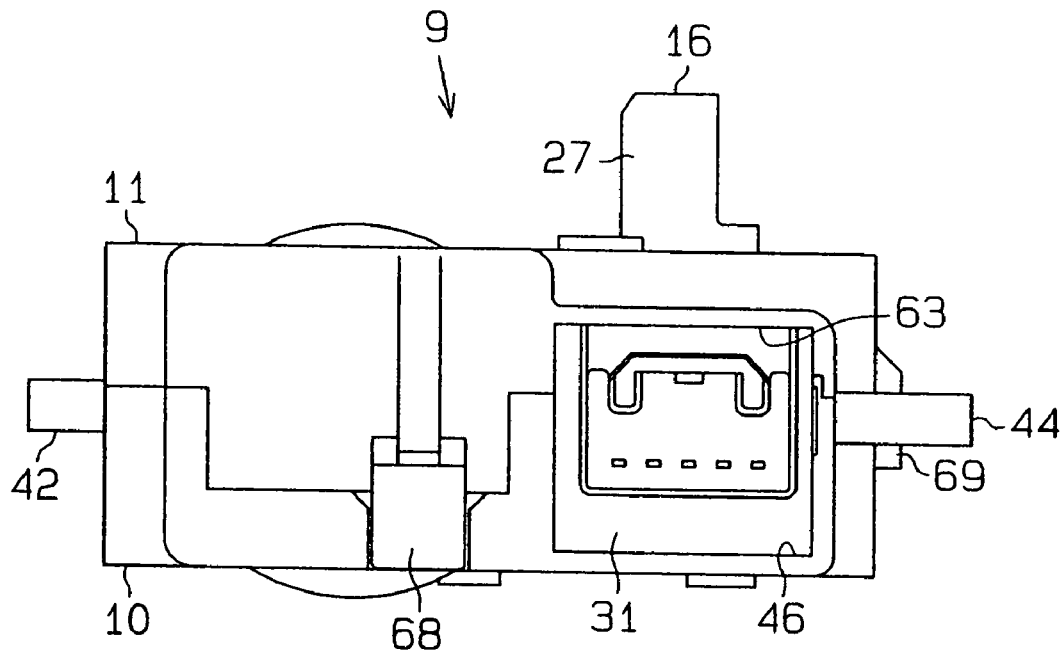
FIG. 10 is a front view of the actuator device.

One of the actuator devices 9 will be described below. As shown in FIG. 10, the housing of the actuator device 9 is formed by assembling a lower case 10 and an upper case 11. An upper wall of the upper case 11 faces to a bottom wall of the lower case 10 with each other. As shown in FIG. 2, the actuator device 9 further comprises a drive motor 12, a worm 13, first, second and third reduction gears 14, 15 and 16, and a connector assembly 30.

Figure 8A:
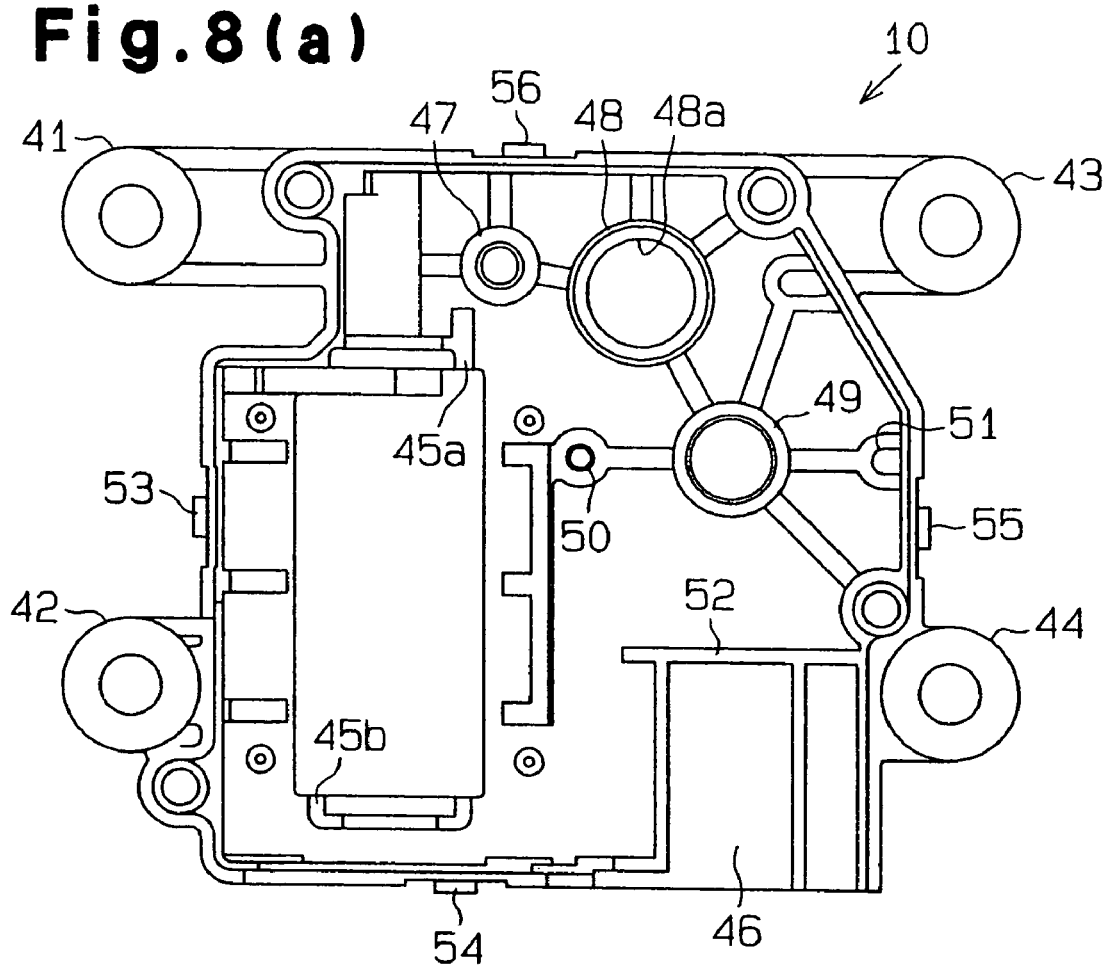
FIG. 8(a) is a top plan view of a lower case in the actuator device of FIG. 2.

As shown in FIG. 8(a), the lower case 10 is formed with a pair of motor support portions 45a and 45b. Both motor support portions 45a and 45b protrude upward from a bottom wall of the lower case 10, and the drive motor 12 is held and fixed between the support portions 45a and 45b.

As shown in FIG. 2, a rotary shaft of the drive motor 12 is provided with the worm 13. The worm 13 is engaged with the first reduction gear 14.

As shown in FIG. 4(a), the first reduction gear 14 comprises a shaft portion 14a. Both end portions of the shaft portion 14a are rotatably supported by first bearings 47 and 64

Figure 9A:
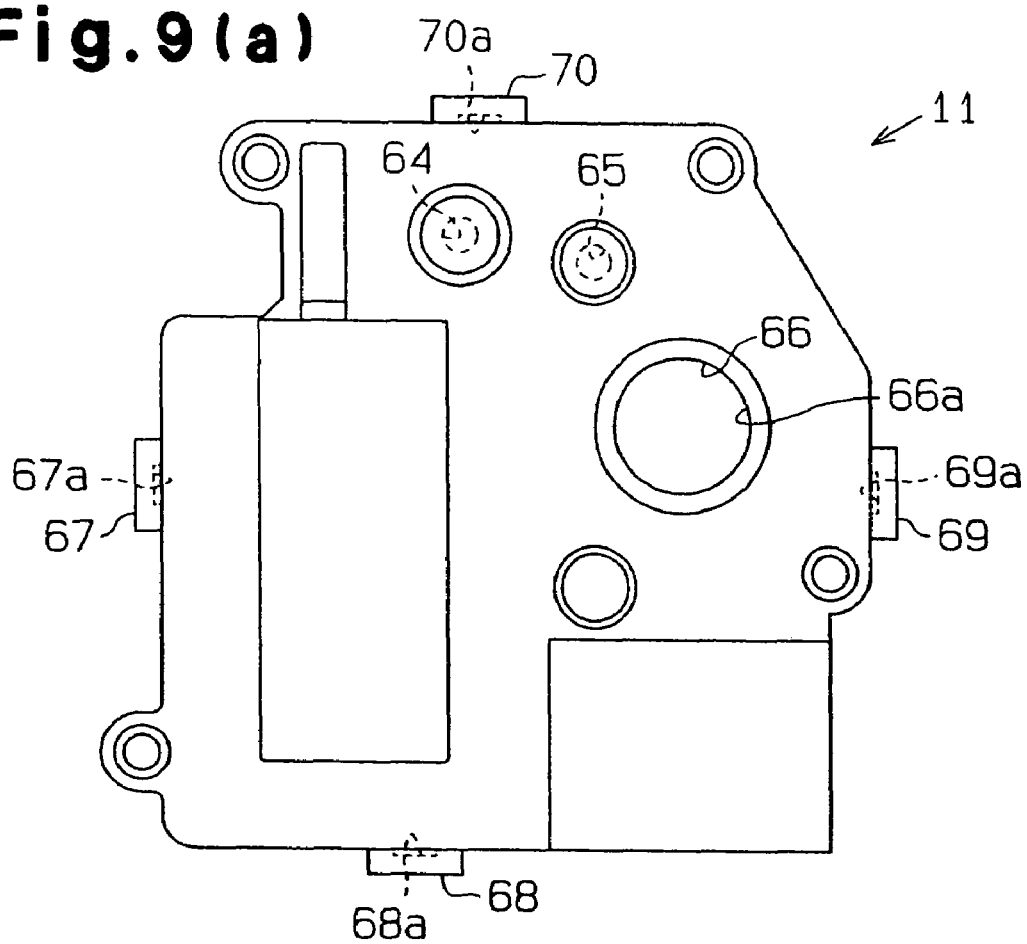
FIG. 9(a) is a top plan view of an upper case.

(refer to FIG. 8(a) and FIG. 9(a)), which are formed at the positions mutually opposed to the lower case 10 and the upper case 11, respectively.

The first bearing 47 has a cylindrical shape, and protrudes upward from the bottom wall of the lower case 10. The first bearing 64 has a cylindrical shape, and protrudes downward from the upper wall of the upper case 11. The diameter of the inner circumferential surface of respective first bearings 47 and 64 is substantially equal to the diameter of the corresponding end portion in the shaft portion 14a.

As shown in FIG. 4(a) and FIG. 4(b), three pieces of the coupling portions 14c are disposed around the shaft portion 14a at equal intervals, and extend from the shaft portion 14a to the outside in a radial direction. The top ends of these coupling portions 14c are integrally coupled with a cylindrical worm wheel 14b.

An elastic portion 18 extends substantially from the center of a longitudinal direction (radial direction of the first reduction gear 14) of the respective coupling portions 14c to a circumferential direction. FIG. 4(c) is a cross-sectional view taken along line 4c-4c of FIG. 4(b). The respective elastic portions 18 extend obliquely upward from the corresponding coupling portions 14c along a circumferential direction. The top end portion 18a of the elastic portion 18 has an inclination slightly gentler comparing to other portion. This top end portion 18a protrudes upward further than the upper end surface of the worm wheel 14b.

Figure 1:
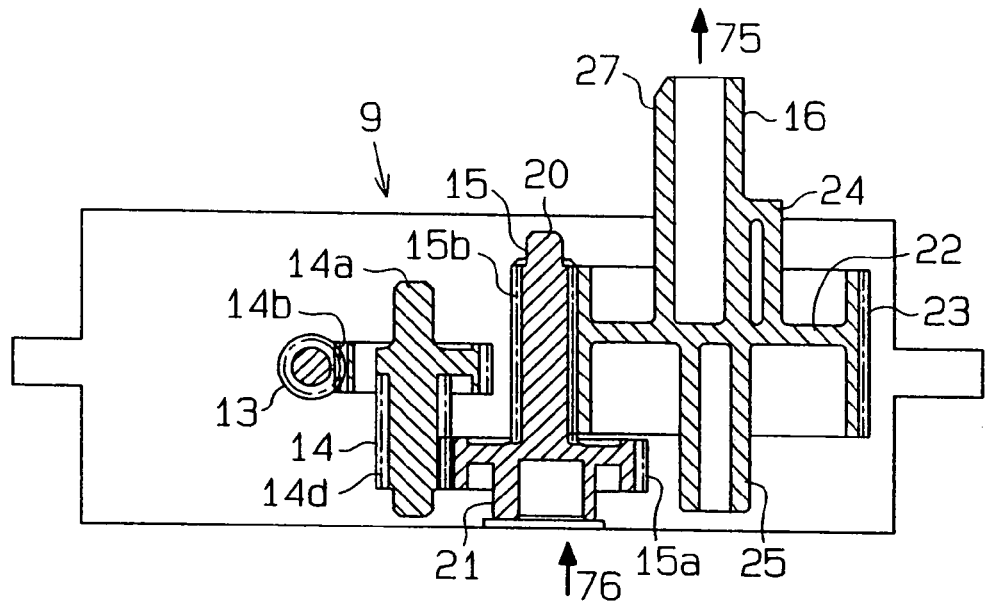
FIG. 1 is a cross-sectional front view representing a coupling state of gears in an actuator device according to a first embodiment of the present invention.

The worm wheel 14b is engaged with the worm 13 (refer to FIGS. 1 and 2)

As shown in FIG. 4(a), a gear portion 14d is formed on the shaft portion 14a. The number of teeth of the gear portion 14d is less than the number of teeth of the worm wheel 14b. The gear portion 14d is engaged with a second reduction gear 15 (refer to FIGS. 1 and 2).

As shown in FIG. 5(a), the second reduction gear 15 comprises a first gear portion 15a and a second gear portion 15b. Both gear portions 15a and 15b are mutually integrally formed. The number of teeth of the first gear portion 15a is more than the number of teeth of the gear portion 14d of the first reduction gear 14. The number of teeth of the second gear portion 15d is less than the number of teeth of the first gear portion 15a. The first gear portion 15a is engaged with the gear portion 14d of the first reduction gear 14 (refer to FIG. 2).

As shown in FIG. 5(a), the first gear portion 15a comprises an upper shaft portion 20 and a cylindrical output shaft 21 on both end portions in its axial direction. The output shaft 21 extends further downward from the lower end surface of the first gear portion 15a. The upper shaft portion 20 extends further upward from the upper end surface of the second gear portion 15b. As shown in FIG. 5(b), an inner circumferential surface of the output shaft 21 is an substantially D-letter shaped in its section.

The output shaft 21 and the upper shaft portion 20 are supported by second bearings 48 and 65 (refer to FIG. 8(a) and FIG. 9(a)) formed at the positions mutually opposed to the lower case 10 and the upper case 11, respectively.

The second bearing 48 has a cylindrical shape, and protrudes upward from the bottom wall of the lower case 10. The diameter of the inner circumferential surface of the second bearing 48 is substantially equal to the diameter of the outer circumferential surface of the output shaft 21. Further, by notching the bottom wall in a circle by matching the shape of the inner circumferential surface of the second bearing 48, the lower case 10 is formed with a first output port 48a. That is, the first output port 48a is formed such that it continues to the inner circumferential surface of the second bearing 48. The inner circumferential surface of the second bearing 48 and the first output port 48a form a through-hole to pass through the lower case 10.

The size in an axial direction of the second bearing 48 shown in FIG. 8(a) is set in such a manner that the lower end surface of the output shaft 21 becomes substantially flush with the outer surface of the bottom wall of the lower case 10. As shown in FIG. 1, on the lower end surface of the actuator device 9, there is located the output shaft 21, and as shown by an arrow 76, the shaft portion of another member is inserted upward into an air space of the output shaft 21, so that a torque is outputted from the actuator device 9.

The second bearing 65 shown in FIG. 9(a) has a cylindrical shape, and protrudes downward from the upper wall of the upper case 11. The inner diameter of the second bearing 65 is substantially equal to the outer diameter of the upper shaft portion 20 of the second reduction gear 15.

The second gear portion 15b of the second reduction gear 15 is engaged with a third reduction gear 16 (refer to FIGS. 1 and 2).

As shown in FIG. 6(a), the third reduction gear 16 comprises a disc portion 22, a cylindrical gear portion 23, a cylindrical upper shaft portion 24 and a cylindrical lower shaft portion 25. The gear portion 23 is integrally formed around the disc portion 22, and engages with the second gear portion 15b. The number of teeth of the gear portion 23 is more than the number of teeth of the second gear portion 15b.

The upper shaft portion 24 protrudes upward from the upper surface of the disc portion 22, and the lower shaft portion 25 extends downward from the lower surface of the disc portion 22.

The output shaft 27 extends upward from the top end of the upper shaft portion 24 and further extends upward from the upper wall of the upper case 11. As shown in FIG. 6(b), the outer circumferential surface of the output shaft 27 has an substantially D-letter shape in its section. As shown in FIG. 6(c), the outer circumferential surface of the lower shaft portion 25 has also a substantially D-letter shape in its section.

The lower shaft portion 25 and the upper shaft portion 24 are supported by third bearings 49 and 66 (refer to FIG. 8(a) and FIG. 9(a)) formed at the positions mutually opposed to the lower case 10 and the upper case 11, respectively.

The third bearing 49 shown in FIG. 8(a) has a cylindrical shape, and protrudes upward from the bottom wall of the lower case 10. The diameter of the inner circumferential surface of the third bearing 49 is substantially equal to the diameter of the outer circumferential surface of the lower shaft portion 25.

The third bearing 66 shown in FIG. 9(a) has a cylindrical shape, and protrudes downward from the upper wall of the upper case 11. The diameter of the inner circumferential surface of the third bearing 66 is substantially equal to the diameter of the outer circumferential surface of the upper shaft portion 24. By notching the upper wall in a circle by matching the shape of the inner circumferential surface of the third bearing 66, the upper case 11 is formed with a second output port 66a. That is, the second output port 66a is formed such that it continues to the inner circumferential surface of the third bearing 66. The inner circumferential surface of the third bearing 66 and the second output port 66a form a through-hole to pass-through the upper case 11.

When the upper shaft portion 24 is inserted into the third bearing 66, as shown in FIG. 1, the upper end surface of the upper shaft portion 24 protrudes upward from the upper wall of the upper case 11. That is, when the actuator device 9 is in an assembled state, the output shaft 27 extending from the upper shaft portion 24 protrudes from the upper end surface of the actuator device 9. As shown in the direction of an arrow 75, the output shaft 27 is inserted upward into another member, so that a torque is outputted from the actuator device 9.

The output shaft 27 of the third reduction gear 16 is inserted into the third bearing 66 of the upper case 11 shown in FIG. 9, and the lower shaft portion 25 is assembled into the connector assembly 30 shown in FIG. 7. The gear portion 23 of the third reduction gear 16 is engaged with the second gear portion 15b (refer to FIGS. 1 and 2).

As shown in FIG. 7, the connector assembly 30 comprises a substantially ring-shaped sensor-housing portion 31, a connector portion 33 and a power feeding portion 34. A substantially ring-shaped sensor 32 is rotatably housed in the sensor-housing portion 31. A press fitting hole 35 having a substantially D-letter shape is formed in the center portion of the sensor 32. The lower shaft portion 25 shown in FIG. 6(a) is pressed into this press fitting hole 35, and the sensor 32 is integrally rotated with the third reduction gear 16. The sensor 32 detects a rotational angle of the third reduction gear 16.

As shown in FIG. 7, an opening end of the sensor-housing portion 31 is formed with a flange 90 extending outward in a radial direction. The outer peripheral portion of the flange 90 is formed with a pair of positioning recesses 36 and 37 spaced apart at intervals of the angle of 180 degrees. These positioning recesses 36 and 37 are formed by notching the flange 90 to the shaft center of the sensor housing portion 31. These positioning recesses 36 and 37 are engaged with positioning projections 50 and 51 (refer to FIG. 8), respectively, which are provided on the lower case 10 and substantially cylindrical-shaped. The positioning projections 50 and 51 are provided on both sides in a mutually opposed direction of the third bearing 49 by pinching the third bearing 49. The lower case 10 comprises a plurality of ribs 52 which protrude from the bottom wall. By the engagement of the positioning recesses 36 and 37 with the positioning projections 50 and 51 and by a plurality of ribs 52, the disposing position of the sensor-housing portion 31 for the lower case 10 is determined.

As shown in FIG. 8(a), the lower case 10 comprises four pieces of fixing members 41 to 44 which protrude left and right substantially in the vicinity of four corner positions. The respective fixing members 41 to 44 are integrally formed with the lower case 10 on the upper end portion of the lower case 10 (refer to FIG. 8(b)).

Figure 8B:
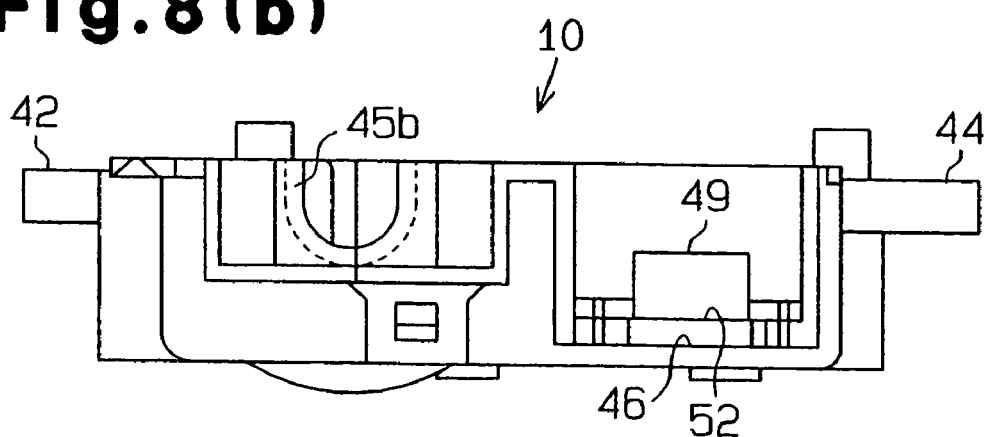
FIG. 8(b) is a top plan view of a lower case of FIG. 8(a)

As shown in FIG. 8(b), a connector insertion portion 46 is formed by notching the side wall of the lower case 10 in a square shape. An unillustrated connecter is inserted into the connector insertion portion 46 from the outside.

Figure 9B:
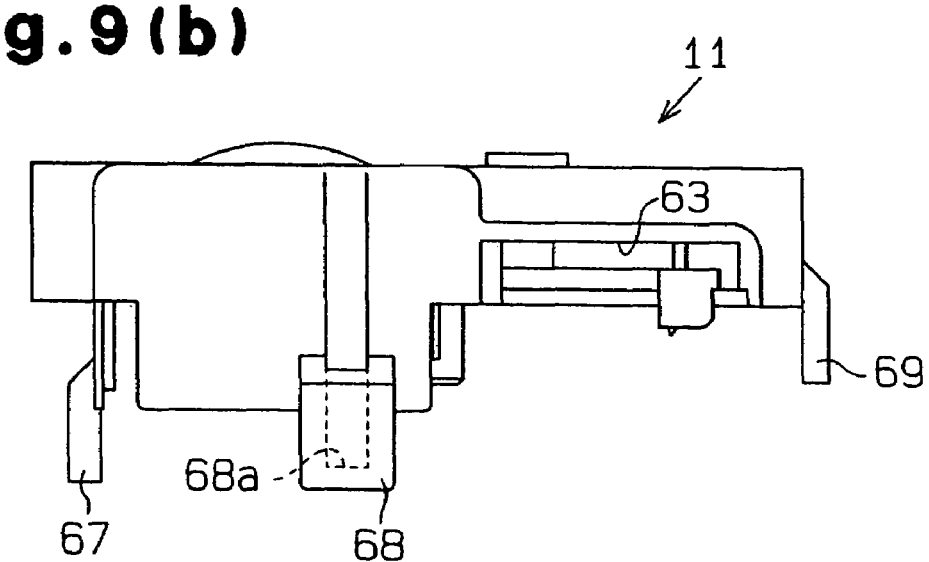
FIG. 9(b) is a front view of the upper case of FIG. 9(a)

As shown in FIG. 8(a), the outer surface of the side wall of the lower case 10 is formed with four pieces of fitting projections 53 to 56 in such a manner as to protrude outside. On the other hand, as shown in FIGS. 9(a) and 9(b), the outer surface of the side wall of the upper case 11 is formed with four pieces of latch claws 67 to 70 in such a manner as to extend downward. These latch claws 67 to 70 correspond to the fitting projections 53 to 56, respectively, and comprises latch recesses 67a to 70a capable of receiving the corresponding fitting projections 53 to 56.

The fitting projections 53 to 56 engage with the latch recesses 67a to 70a of the corresponding latch claws 67 to 70, respectively so that the upper case 11 and the lower case 10 are mutually assembled as shown in FIG. 10.

As shown in FIG. 9(a), the outer shape of the upper case 11 is substantially equal to the outer shape of the lower case 10.

A connecter inserting portion 63 provided on the upper case 11 is opposed to the connector insertion portion 46 formed on the lower case 10 in an assembled state with the lower case 10.

As shown in FIG. 9(b), the connector inserting portion 63 is formed by notching the side wall of the upper case 11 in a square shape. An unillustrated connector is inserted into the connector inserting portion 63 from the outside.

The lower case 10 and the upper case 11 assembled in this way, as shown in FIG. 10, have the fixing members 41 to 44 protruded on both end portions in the left and right of the actuator device 9. The respective fixing members 41 to 44 are disposed up and down substantially at the center position of the actuator device 9.

Next, the operation of the actuator device 9 constituted as above will be described.

First, the number of revolutions of the first reduction gear 14 and the torque will be described.

Suppose that the drive motor 12 is configured that the number of revolutions at the conducting time is 3000 revolutions per minute and the torque thereof is 0.1 kgf·cm (0.00981J). At this time, the number of revolutions of the first reduction gear 14 becomes a value obtained by dividing the number of revolutions of the drive motor 12 by the number of teeth of the worm wheel 14b. Consequently, providing that the number of teeth of the worm wheel 14b is, for example, 30 pieces, the number of revolutions of the first reduction gear 14 becomes 100 revolutions per minute (3000/30=100).

The torque transmitted to the first reduction gear 14 is in reverse proportion to the number of revolutions. The transmitted torque is found by multiplying the output torque of the drive motor 12 by 30 and, further, by reflecting the transmission efficiency of the torque between the worm 13 and the first reduction gear 14. Provided that the transmission efficiency of the torque between the worm 13 and the first reduction gear 14 is 40%, the torque to be calculated of the first reduction gear 14 becomes 0.1 kgf·cm×30×0.4=1.2 kgf·cm (0.118J).

Next, the number of revolutions and the torque of the second reduction gear 15 will be described.

The number of revolutions of the second reduction gear 15 is determined by the number of revolutions of the first reduction gear 14. To be more specific, the number of revolutions of the second reduction gear 15 is obtained by first multiplying the number of revolutions (100 revolutions per minute) of the first reduction gear 14 by the number of teeth of the gear portion 14d and then dividing the multiplication result by the number of teeth of the first gear portion 15a of the second reduction gear 15. Consequently, provided that the number of the teeth of the gear portion 14d of the first reduction gear 14 is, for example, ten and the number of teeth of the first gear portion 15a of the second reduction gear 15 is, for example, thirty, the number of revolutions of the second reduction gear 15 becomes 33.3 revolutions per minute (100×10/30=33.3).

The number of revolutions of the second reduction gear 15 is one third of the number of revolutions of the first reduction gear 14. Therefore, the torque transmitted to the second reduction gear 15 becomes a value of the torque of the first reduction gear 14 multiplied by three. Provided that the transmission efficiency of the torque between the first reduction gear 14 and the second reduction gear 15 is 90%, the torque to be calculated of the second reduction gear 15 becomes 1.2 kgf·cm×3×0.9=3.24 kgf·cm (0.318J).

Lastly, the number of revolutions and the torque of the third reduction gear 16 will be described.

The number of revolutions of the third reduction gear 16 is determined by the number of revolutions of the second reduction gear 15. To be more precise, the number of revolutions of the third reduction gear 16 is obtained by first multiplying the value of the number of revolutions (33.3 revolutions per minute) of the second reduction gear 15 by the number of teeth of the second gear portion 15b, and then dividing the multiplication result by the number of teeth of the gear portion 23 of the third reduction gear 16. Consequently, provided that the number of teeth of the second gear portion 15b of the second reduction gear 15 is, for example, ten and the number of the teeth of the gear portion 23 of the third reduction gear 16 is, for example, thirty, the number of revolutions of the third reduction gear 16 becomes 11.1 revolutions per minute (33.3×10/30=11.1).

The number of revolutions of the third reduction gear 16 is one third of the number of revolutions of the second reduction gear 15. Therefore, the torque transmitted to the third reduction gear 16 becomes a value of the torque of the second reduction gear 15 multiplied by three. Provided that the transmission efficiency of the torque between the second reduction gear 15 and the third reduction gear 16 is taken as 90%, the torque to be calculated of the third reduction gear 16 becomes 3.24 kgf·cm×3×0.9=8.75 kgf·cm (0.858J).

In this way, the revolving movement of the drive motor 12 is gradually transmitted in order while the number of revolutions thereof is reduced by the first to third reduction gears 14 to 16, and the first to third reduction gears 14 to 16 perform the revolving movement by a mutually different torque.

The above-described present embodiment has the following advantages.

The output shaft 21 of the second reduction gear 15 and the output shaft 27 of the third reduction gear 16 are driven respectively by a different torque. Therefore, in the case where a great torque is required to drive a damper 4 comparing to dampers 2 and 3 shown in FIG. 11, the torque which is outputted from the output shaft 21 can be used to drive the dampers 2 and 3, and the torque which is outputted from the output shaft 27 is used to drive the damper 4. Consequently, the different requirements of the output torque are satisfied by the same actuator device 9, thereby enhancing general-purpose properties of the actuator device 9.

The lower case 10 is provided with the output shaft 21, and the upper case 11 is provided with the output shaft 27. Therefore, for example, comparing to the case where the lower case 10 is provided with all the output shafts, the respective output shafts can be easily discriminated, and the mistakes in the assembly with companion members are prevented. Consequently, an assembly operability of the actuator device 9 is enhanced.

By disposing the output shafts 21 and 27 separately on the corresponding lower case 10 and upper case 11, respectively, a plurality of output shafts can be easily used by the single actuator device 9.

The output shaft 21 is provided on the lower case 10 in such a manner that the end surface of the lower case 10 and the end surface of the output shaft 21 are contained in the same flat surface. Therefore, the output shaft 21 does not protrude from the lower case 10, so that assembly properties of the actuator device 9 is enhanced.

Since two pieces of the output shafts 21 and 27 are used, the provided output shafts can be discriminated at a glance, so that the mistakes in the assembly with the companion members are prevented.

All the fixing members 41 to 44 are provided substantially at the center position in the vertical direction of the actuator device 9. Consequently, comparing to the case where the respective fixing members 41 to 44 are provided at different positions in relation to the vertical direction of the actuator device 9, the outer shape space required by the fixing members becomes, substantially the same, for example, even in the case where the actuator device 9 is disposed in reverse, and this leads to the enhancement of the assembly properties of the actuator device 9.

Second Embodiment

An actuator device 80 according to a second embodiment of the present invention will be described below according to FIGS. 12 to 13(b).

The actuator device 80 in the present embodiment is configured by changing the way that the output shaft 21 of the actuator device 9 of the embodiment shown FIGS. 1 to 11 is protrudes to the outside, and other constitutions are the same as those of the first embodiment shown in FIGS. 1 to 11. Consequently, in the present embodiment, only the constitutions different from the actuator device 9 of the first embodiment shown in FIGS. 1 to 11 will be described.

In the case of the actuator device 80 in the present embodiment, the first output portion 48a formed on the lower case 10 of the actuator device 9 of FIG. 1 is blocked. That is, the shaft of the companion member is not inserted upward into the lower case 10 similarly with an arrow mark 76 shown in FIG. 1.

Figure 12:
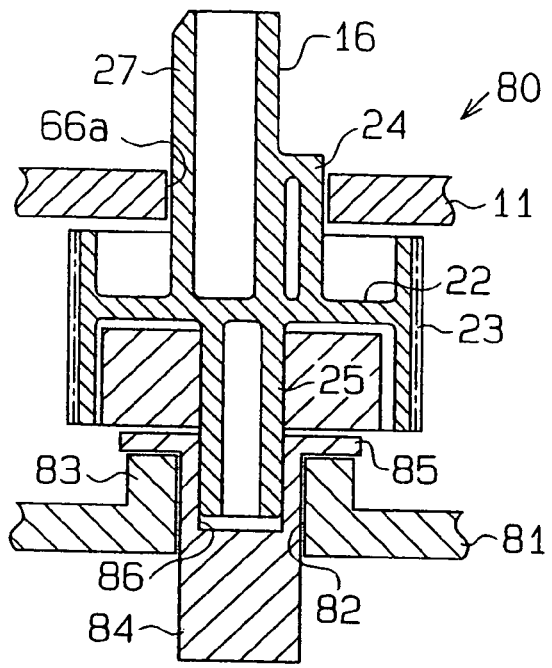
FIG. 12 is a cross-sectional view of a main portion of the actuator device according to a second embodiment of the present invention.

As shown in FIG. 12, an output shaft 27 protrudes upward from an upper case 11, and an auxiliary shaft 84 protrudes downward from a lower case 81.

The lower case 81 is formed with a third output port 82 to pass through the bottom wall of the lower case 81. The third output portion 82 is formed by notching the bottom wall of the lower case 81 in a circle. The third output portion 82 is formed on the same shaft with a second output port 66a. The diameter of the inner circumferential surface of the third output port 82 is greater than the diameter of the outer circumferential surface of the lower shaft portion 25 of a third reduction gear 16.

A third bearing 83 having a cylindrical shape protrudes upward from the bottom wall of the lower case 81. The diameter of the inner circumferential surface of the third bearing 83 is equal to the diameter of the inner circumferential surface of the third output port 82. That is, the inner circumferential surface of the third bearing 83 continues to the inner circumferential surface of the third output port 82. The inner circumferential surface of the third bearing 83 and the third output port 82 form a through-hole to pass through the lower case 81.

The auxiliary shaft 84 is rotatably supported on the third bearing 83. The auxiliary shaft 84 has a substantially cylindrical shape, and a flange portion 85 extending across a whole periphery of the auxiliary shaft 84 is formed at a longitudinal one end portion (top end portion in FIG. 12). The diameter of the outer circumferential surface of the auxiliary shaft 84 is slightly less than the diameter of the inner circumferential surface of the third output port 82, and is substantially equal to the diameter of the outer circumferential surface of the output shaft 27.

The diameter of the outer circumferential surface of the flange portion 85 is substantially equal to the diameter of the outer circumferential surface of the third bearing 83. The flange portion 85 abuts against the upper end surface of the bearing 83, so that the auxiliary shaft 84 is prevented from coming off.

The auxiliary shaft 84 is formed with an engaging hole 86 extending from its top end along an axial direction. The shape of the outer circumferential surface of the engaging hole 86 is substantially the same as the shape of the outer circumferential surface of a lower shaft portion 25 of a third reduction gear 16. The inner circumferential surface of the engaging hole 86 has an substantially D-letter shape in its cross-section. The lower shaft portion 25 of the third reduction gear 16 is inserted into the engaging hole 86, so that the third reduction gear 16 is unrotatabley assembled for the auxiliary shaft 84. In this way, both end portions in an axial direction of the third reduction gear 16 are provided respectively with the output shaft 27 and the auxiliary shaft 84, respectively.

Figure 13A:
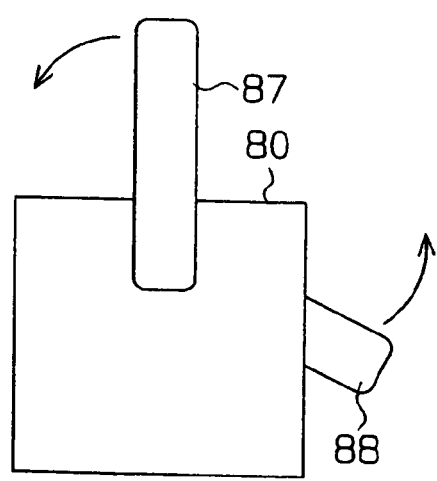
FIGS. 13(a) and 13(b) are external views of the actuator device of FIG. 12.
Figure 13B:
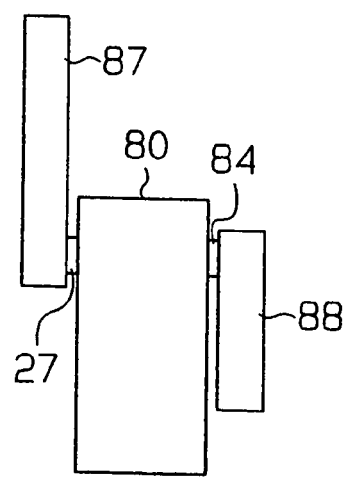

Consequently, the output shaft 27 and the auxiliary shaft 84, which are integrally rotated at mutually opposed places (in vertical direction as viewed in FIG. 12) in an axial direction, respectively, are coupled to corresponding prescribed coupling members 87 and 88, respectively as shown in FIGS. 13(*a*) and 13(*b*).

The coupling member 87 and the coupling member 88 are relatively unrotatably coupled to the output shaft 27 and the auxiliary shaft 84, respectively. To be more precise, the coupling member 87 has an unillustrated engaging hole corresponding to the outer shape of the output shaft 27 and having an almost D-letter shape in its section. The output shaft 27 portion is coupled to the engaging hole.

The coupling member 88 is formed with an unillustrated insertion hole. The auxiliary shaft 84 is inserted into the insertion hole, so that the auxiliary shaft 84 and the coupling member 88 are mutually unrotatably coupled. To describe more in detail, the outer edge of the auxiliary shaft 84 is formed with an unillustrated groove along the axial direction of the auxiliary shaft 84. The insertion hole is provided with a projection protruding from its inner circumferential surface to a shaft center. The auxiliary shaft 84 is inserted into the insertion hole so that the projection engages with the groove, thereby mutually unrotatably coupling the coupling member 88 and the auxiliary shaft 84.

Next, the operation of the actuator device 80 constituted as above will be described according to FIGS. 12 to 13(*b*).

The lower shaft portion 25 of the third reduction gear 16 is inserted into the engaging hole 86 formed on the auxiliary shaft 84. The lower shaft portion 25 is relatively unrotatably assembled with the auxiliary shaft 84. Therefore, the torque of the third reduction gear 16 is outputted through the auxiliary shaft 84. To describe more in detail, the torque which is transmitted from the outer circumferential surface of the lower shaft portion 25 to the auxiliary shaft 84 through the inner circumferential surface of the auxiliary shaft 84 is transmitted to the coupling member 88 through the groove of the auxiliary shaft 84 and the projection of the insertion hole.

In this way, the torque is outputted through the groove of the auxiliary shaft 84 having the diameter greater than the diameter of the outer circumferential surface of the lower shaft portion 25, so that a load required to transmit the torque becomes small comparing to the case where the torque is directly transmitted from the outer circumferential surface of the lower shaft portion 25 to the coupling member 88 since the distance from the shaft center to an point of action becomes long.

As described above, the present embodiment has the following advantages in addition to the advantages of the first embodiment shown in FIGS. 1 to 11.

The auxiliary shaft 84 having the diameter greater than the diameter of the outer circumferential surface of the lower shaft portion 25 is coupled to the lower shaft portion 25 of the third reduction gear 16. Thereby, the distance from the shaft center of the lower shaft portion 25 to the point of action transmitting a force to the coupling member 88 becomes long, and therefore, the torque of the third reduction gear 16 is transmitted to the coupling member 88 by a small load. Consequently, the torque is reliably transmitted without applying a great load on the engaged place between the auxiliary shaft 84 and the coupling member 88.

By coupling the auxiliary shaft 84 to the lower shaft portion 25, the torque of the third reduction gear 16 can be reliably transmitted to the coupling member 88, so that the diameter of the lower shaft portion 25 can be made small. Therefore, a sensor 32 housed within the third reduction gear 16 can be made small. Consequently, by downsizing the sensor 32 and the third reduction gear 16, the actuator device 80 can be downsized.

The output shaft 27 and the auxiliary shaft 84 are disposed on the same shaft of the third reduction gear 16. Therefore, the coupling members 87 and 88, which are coupled to mutually opposed positions of the actuator device 80, can be simultaneously driven.

The auxiliary shaft 84 and the output shaft 27 having a substantially equal diameter are protruded in a mutually opposed direction of the actuator device 80. Therefore, in both the mutually opposed directions of the actuator device 80, the substantially equal output shaft and the torque can be used, so that an assembly direction can be reversed.

It should be apparent to those skilled in the art that the present invention may be embodied in many other specific forms without departing from the spirit or scope of the invention. Particularly, it should be understood that the invention may be embodied in the following forms.

In the above described embodiments, the number of reduction gears are not limited to the first to third reduction gears 14 to 16, but may be changed as necessary.

In the above embodiments, the torque may be outputted to the outside from the shaft portion 14*a* of the first reduction gear 14.

In the above embodiments, the first reduction gear 14 may be assembled so as to engage with the second reduction gear 15, the third reduction gear 16, and the like at the same time.

In the above embodiments, all the output ports may be formed on the lower case 10. Further, all the output ports may be formed on the upper case 11.

In the above embodiments, the output shafts may be provided on both sides of the lower shaft portion and the upper shaft portion of the second and third reduction gears 15 and 16, respectively.

In the above embodiments, instead of the output shaft 21 comprising an air space, the output shaft comprising a protruding portion protruding downward may be used.

In the above embodiments, the output shaft comprising the air space portion may be provided on the upper shaft portion 24.

In the above embodiments, the fixing members 41 to 44 may be integrally formed with the upper case 11 instead of being integrally formed with the lower case 10.

In the above embodiments, the number of teeth of the worm wheel 14*b* and the gear portion 14*d* of the first reduction gear 14 are not limited to thirty and ten, respectively, but may be changed as necessary.

In the above embodiments, the number of teeth of the first gear portion 15*a* and the second gear portion 15*b* of the second reduction gear 15 are not limited to thirty and ten, respectively, but may be changed as necessary.

In the above embodiments, the number of teeth of the gear portion 23 of the third reduction gear 16 is not limited to thirty, but may be changed as necessary.

In the embodiment of FIGS. 12 to 13(*b*), the auxiliary shaft 84 may be mounted on other gears than the third reduction gear 16.

In the embodiment of FIGS. 12 to 13(*b*), the outer diameter of the auxiliary shaft 84 may be changed as necessary. Further, by changing the outer diameter of the auxiliary shaft 84 in this way as necessary, the coupling with various coupling members are made possible, thereby enhancing the general-purpose properties of the actuator device.

In the embodiment of FIGS. 12 to 13(*b*), the auxiliary shaft 84 and the coupling member 88 may be mutually unrotatably coupled, and the auxiliary shaft 84 and the coupling member 88 may be coupled by engaging means other than the groove and the projection.

In the embodiment of FIGS. 12 to 13(*b*), the first output port 48*a* may be formed on the lower case 81, and a gear torque may be applied on both end portions in an axial direction of the third reduction gear 16, so that the torque may be outputted from the output shaft 21 of the second reduction gear 15.

The present examples and embodiments are to be considered as illustrative and not restrictive and the invention is not to be limited to the details given herein, but may be modified within the scope and equivalence of the appended claims.

The invention claimed is:

1. An actuator device, comprising:
   a drive motor;
   a plurality of gears that are rotated by torque outputted from the drive motor;
   pairs of rotary shafts, each pair corresponding to one of the gears, wherein the rotary shafts in each pair extend from both axial sides of the corresponding gear, respectively, and wherein at least two of the rotary shafts function as output shafts that are capable of outputting the torque of the corresponding gear or gears to the outside; and
   a housing for accommodating the gears, wherein the rotary shafts functioning as the output shafts extend in different directions from the corresponding gear or gears, wherein the housing includes opposing walls, wherein one of the rotary shafts functioning as the output shafts projects from one of the opposing walls, and the other rotary shaft functioning as the output shaft does not project from either of the opposing walls.

2. The actuator device according to claim 1, wherein at least one pair of the rotary shafts, which extend from both axial sides of one of the gears, function as the output shafts.

3. The actuator device according to claim 1, wherein the gears transmit torque in order at different reduction ratios, and wherein the rotary shafts functioning as the output shafts are formed on at least two of the gears, respectively.

4. The actuator device according to claim 1, wherein the gears transmit torque to a gear at a final stage, wherein each gear rotates at a number of revolutions that is different from that of the previous gear, and wherein one of the rotary shafts functioning as the output shafts is formed on the gear at the final stage, and the other rotary shaft functioning as the output shaft is formed on at least one of the other gears.

5. The actuator device according to claim 1, wherein at least one of the two rotary shafts has a recess that opens to the outside.

6. The actuator device according to claim 1, wherein a fixing member is integrally formed with the housing, the fixing member being used for fixing the actuator device to an object, and wherein the fixing member is located at a center in a thickness direction of the housing.

7. An actuator device, comprising:
   a housing;
   a drive motor accommodated in the housing;
   a power transmission mechanism accommodated in the housing to transmit torque outputted from the drive motor, wherein the power transmission mechanism includes a plurality of gears and at least two output shafts, wherein the output shafts are formed either on one of the gears or on two or more gears, and wherein each output shaft is capable of outputting the torque of the corresponding gear to the outside of the housing,
   wherein the output shafts extend in different directions from the corresponding gear or gears, wherein the housing includes opposing walls, wherein one of the output shafts projects from one of the opposing walls, and the other output shaft does not project from either of the opposing walls.

8. The actuator device according to claim 7, wherein the output shafts extend from both axial sides of at least one of the gears.

9. The actuator device according to claim 7, wherein the gears transmit torque in order at different reduction ratios, and wherein the output shafts are formed on at least two of the gears, respectively.

10. The actuator device according to claim 7, wherein the gears transmit torque to a gear at a final stage, wherein each gear rotates at a number of revolutions that is different from that of the previous gear, and wherein one of the output shafts is formed on the gear at the final stage, and the other output shaft is formed on at least one of the other gears.

11. An actuator device, comprising:
    a drive motor;
    a plurality of gears that are rotated by torque outputted from the drive motor; and
    pairs of rotary shafts, each pair corresponding to one of the gears, wherein the rotary shafts in each pair extend from both axial sides of the corresponding gear, respectively, and wherein at least two of the rotary shafts function as output shafts that are capable of outputting the torque of the corresponding gear or gears to the outside,
    wherein at least one of the rotary shafts functioning as the output shafts has a sensor for detecting a rotational angle position of the corresponding gear, and wherein the rotary shaft having the sensor is coupled to an auxiliary shaft, the outer diameter of which is greater than that of the rotary shaft having the sensor and is equal to that of the other rotary shaft of the corresponding gear.

12. The actuator device according to claim 11, wherein at least one pair of the rotary shafts, which extend from both axial sides of one of the gears, function as the output shafts.

13. The actuator device according to claim 11, wherein the gears transmit torque in order at different reduction ratios, and wherein the rotary shafts functioning as the output shafts are formed on at least two of the gears, respectively.

14. The actuator device according to claim 11, wherein the gears transmit torque to a gear at a final stage, wherein each gear rotates at a number of revolutions that is different from that of the previous gear, and wherein one of the rotary shafts functioning as the output shafts is formed on the gear at the final stage, and the other rotary shaft functioning as the output shaft is formed on at least one of the other gears.

15. The actuator device according to claim 11, wherein at least one of the two rotary shafts has a recess that opens to the outside.

16. The actuator device according to claim 11, further comprising a housing for accommodating the gears, wherein a fixing member is integrally formed with the housing, the fixing member being used for fixing the actuator device to an object, and wherein the fixing member is located at a center in a thickness direction of the housing.

17. An actuator device, comprising:
    a housing;
    a drive motor accommodated in the housing;
    a power transmission mechanism accommodated in the housing to transmit torque outputted from the drive motor, wherein the power transmission mechanism includes a plurality of gears and at least two output shafts, wherein the output shafts are formed on one of the gears and extend in different directions from the corresponding gear, and wherein each output shaft is capable of outputting the torque of the corresponding gear to the outside of the housing,
    wherein one of the output shafts has a sensor for detecting a rotational angle position of the corresponding gear, and wherein the output shaft having the sensor is coupled to an auxiliary shaft, the outer diameter of which is greater than that of the output shaft having the sensor and is equal to that of the output shaft that is different from the output shaft having the sensor.

* * * * *